(12) United States Patent
Ido et al.

(10) Patent No.: US 12,392,469 B2
(45) Date of Patent: Aug. 19, 2025

(54) LIGHTING APPARATUS WITH LIQUID CRYSTAL ELEMENT TILTED WITH RESPECT TO THE OPTICAL AXIS OF THE PROJECTION LENS, VEHICLE LAMP SYSTEM HAVING THE SAME AND LIGHTING APPARATUS WITH PRISMS TO REFRACT A TRAVELING DIRECTION BEFORE AND AFTER A LIQUID CRYSTAL ELEMENT

(71) Applicant: Stanley Electric Co., Ltd., Tokyo (JP)

(72) Inventors: Hiroaki Ido, Tokyo (JP); Matsuo Kamei, Tokyo (JP); Yoshihisa Iwamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/562,718

(22) PCT Filed: May 16, 2022

(86) PCT No.: PCT/JP2022/020404
§ 371 (c)(1),
(2) Date: Nov. 20, 2023

(87) PCT Pub. No.: WO2022/244736
PCT Pub. Date: Nov. 24, 2022

(65) Prior Publication Data
US 2024/0230051 A1    Jul. 11, 2024

(30) Foreign Application Priority Data
May 21, 2021    (JP) .................................. 2021-086065

(51) Int. Cl.
*F21S 41/64*    (2018.01)
*F21S 41/135*    (2018.01)
(Continued)

(52) U.S. Cl.
CPC ........... *F21S 41/645* (2018.01); *F21S 41/135* (2018.01); *F21S 41/147* (2018.01); *F21S 41/27* (2018.01)

(58) Field of Classification Search
CPC . G02F 1/133601; F21S 41/135; F21S 41/147; F21S 41/27; F21S 41/64; F21S 41/645
See application file for complete search history.

(56) References Cited

U.S. PATENT DOCUMENTS 5,402,324 A * 3/1995 Yokoyama ................ F21V 9/14
                                                                362/19
2008/0198372 A1 * 8/2008 Pan ......................... F21S 41/645
                                                                356/121
(Continued)

FOREIGN PATENT DOCUMENTS

EP    3599417 A1    1/2020
JP    H09-500982 A   1/1997
(Continued)

OTHER PUBLICATIONS

International Search Report for PCT/JP2022/020404 dated Jul. 5, 2022.
(Continued)

*Primary Examiner* — Abdulmajeed Aziz
*Assistant Examiner* — Steven Y Horikoshi
(74) *Attorney, Agent, or Firm* — KENEALY VAIDYA LLP

(57) ABSTRACT

To improve the brightness of irradiated light in the lighting apparatus using a liquid crystal element. A lighting apparatus includes: a light source; a condensing unit that condenses light emitted from the light source so that it forms a focal point at a predetermined position; a liquid crystal element arranged corresponding to the position of the focal point; a first polarizing element located on a light incident side of the liquid crystal element; a second polarizing element located
(Continued)

on a light emitting side of the liquid crystal element; a first prism array that refracts a traveling direction of the light heading toward the liquid crystal element and a second prism array that refracts a traveling direction of light emitted from the liquid crystal element.

7 Claims, 9 Drawing Sheets

(51) Int. Cl.
*F21S 41/147* (2018.01)
*F21S 41/27* (2018.01)

(56) References Cited

U.S. PATENT DOCUMENTS

| | | | |
|---|---|---|---|
| 2016/0290583 A1* | 10/2016 | Suwa | B62J 45/4151 |
| 2019/0017681 A1* | 1/2019 | Hoshino | G02F 1/29 |
| 2019/0226656 A1 | 7/2019 | Toko et al. | |
| 2019/0360653 A1* | 11/2019 | Toko | F21S 41/135 |
| 2020/0011501 A1* | 1/2020 | Kunii | F21S 41/25 |
| 2020/0032977 A1* | 1/2020 | Toko | F21S 41/645 |
| 2020/0332977 A1* | 10/2020 | Miedler | F21S 41/645 |

FOREIGN PATENT DOCUMENTS

| | | |
|---|---|---|
| JP | 2018-185896 A | 11/2018 |
| JP | 2019-128449 A | 8/2019 |
| JP | 2020-017367 A | 1/2020 |

OTHER PUBLICATIONS

Extended European Search Report for EP patent application No. 22804647.0 dated May 12, 2025.

* cited by examiner

LIGHTING APPARATUS WITH LIQUID CRYSTAL ELEMENT TILTED WITH RESPECT TO THE OPTICAL AXIS OF THE PROJECTION LENS, VEHICLE LAMP SYSTEM HAVING THE SAME AND LIGHTING APPARATUS WITH PRISMS TO REFRACT A TRAVELING DIRECTION BEFORE AND AFTER A LIQUID CRYSTAL ELEMENT This application is a U.S. National Stage Application under 35 U.S.C § 371 of International Patent Application No. PCT/JP2022/020404 filed May 16, 2022, which claims the benefit of priority under 35 U.S.C. § 119 to Japanese Patent Application No. 2021-086065 filed May 21, 2021, the disclosures of all of which are hereby incorporated by reference in their entireties.

TECHNICAL FIELD

The present disclosure relates to a lighting apparatus and a vehicle lamp system.

BACKGROUND ART

Japanese Patent Application Laid-Open No. 2019-128449A (Patent Document 1) discloses a variable light distribution headlamp as an example of a lighting apparatus using a vertically aligned liquid crystal element. However, there is room for improvement in terms of improving brightness of irradiated light emitted from the lighting apparatus.

PRIOR ART DOCUMENT

Patent Document

Patent Document 1: Japanese Patent Application Laid-Open No. 2019-128449A

SUMMARY OF THE INVENTION

Technical Problem

In a specific aspect, it is an object of the present disclosure to improve brightness of irradiated light in a lighting apparatus or the like that uses a liquid crystal element.

Solution to the Problem (1) A lighting apparatus according to one aspect of the present disclosure is a lighting apparatus including: (a) a light source; (b) a condensing unit that condenses light emitted from the light source so that it forms a focal point at a predetermined position; (c) a liquid crystal element arranged corresponding to the position of the focal point; (d) a first polarizing element disposed on a light incident surface of the liquid crystal element; (e) a second polarizing element disposed on a light emitting surface of the liquid crystal element; and (f) a projection lens that magnifies and projects images generated by the liquid crystal element, the first polarizing element, and the second polarizing element; (g) where the liquid crystal element is arranged at a tilt such that the light incident surface and/or the light emitting surface form a predetermined angle that is non-orthogonal and non-parallel to the optical axis of the projection lens.

(2) A lighting apparatus according to one aspect of the present disclosure is a lighting apparatus including: (a) a light source; (b) a condensing unit that condenses light emitted from the light source so that it forms a focal point at a predetermined position; (c) a liquid crystal element arranged corresponding to the position of the focal point; (d) a first polarizing element disposed on a light incident surface of the liquid crystal element; (e) a second polarizing element disposed on a light emitting surface of the liquid crystal element; and (f) a projection lens that magnifies and projects images generated by the liquid crystal element, the first polarizing element, and the second polarizing element; (g) where the liquid crystal element has a liquid crystal layer disposed between a pair of substrates, and a layer thickness direction of the liquid crystal layer forms a predetermined angle that is non-orthogonal and non-parallel to the optical axis of the projection lens.

(3) A lighting apparatus according to one aspect of the present disclosure is a lighting apparatus including: (a) a light source; (b) a condensing unit that condenses light emitted from the light source so that it forms a focal point at a predetermined position; (c) a liquid crystal element arranged corresponding to the position of the focal point; (d) a first polarizing element disposed on a light incident surface of the liquid crystal element; (e) a second polarizing element disposed on a light emitting surface of the liquid crystal element; (f) a projection lens that magnifies and projects images generated by the liquid crystal element, the first polarizing element, and the second polarizing element; (g) a first prism array disposed between the liquid crystal element and the first polarizing element; and (h) a second prism array disposed between the liquid crystal element and the second polarizing element; (i) where the liquid crystal element is arranged such that the light incident surface and/or the light emitting surface are substantially perpendicular to the optical axis of the projection lens, and (j) where the first prism array refracts a traveling direction of the light heading toward the liquid crystal element and causes the light incident to the liquid crystal element, and the second prism array refracts a traveling direction of the light emitted from the liquid crystal element and causes the light incident to the second polarizing element.

(4) A vehicle lamp system according to one aspect of the present disclosure is a vehicle lamp system including the lighting apparatus according to the above-described (1) to (3) and a controller that is connected to the lighting apparatus and controls its operation.

According to the above configurations, it is possible to improve brightness of irradiated light in the lighting apparatus or the like that uses a liquid crystal element.

Figure 4A:
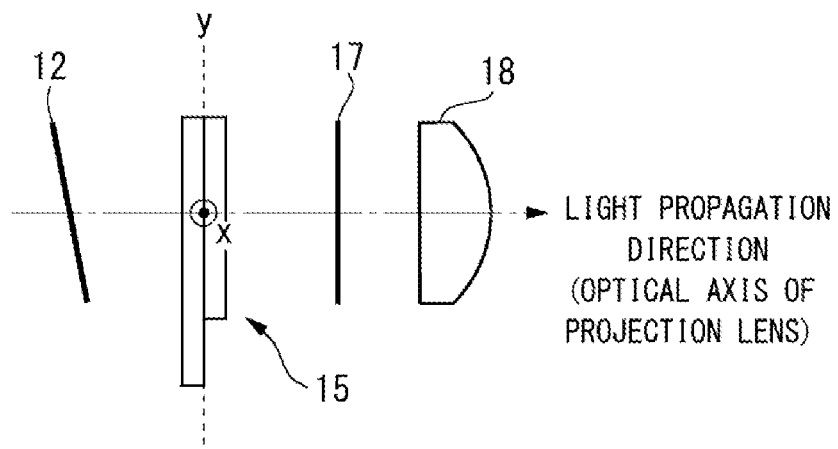
FIG. 4A is a diagram showing a configuration in which the liquid crystal element is arranged without being tilted.
Figure 4B:
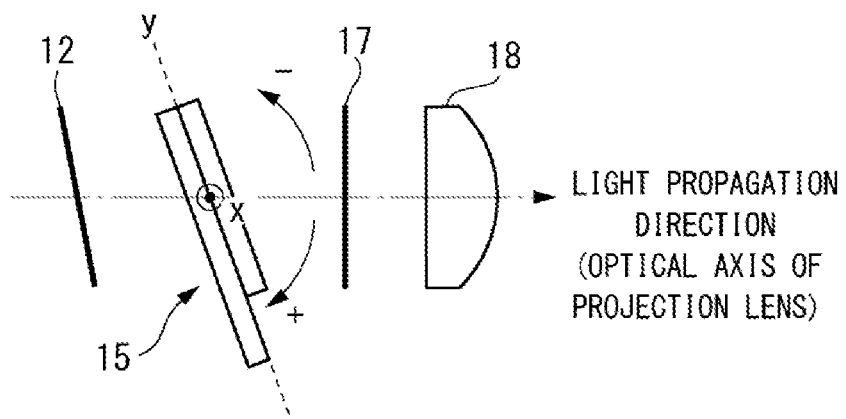
Figure 4C:
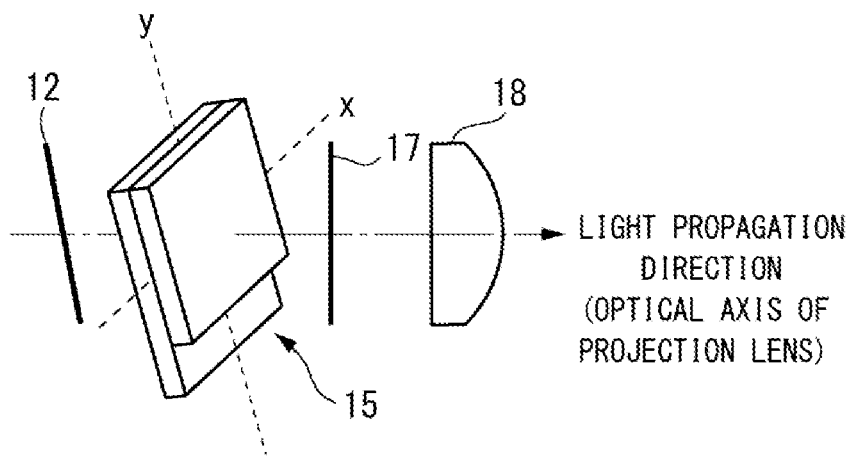

Each of FIGS. 4B and 4C is a diagram showing a configuration example in which the liquid crystal element is arranged at a tilt.

Figure 5A:
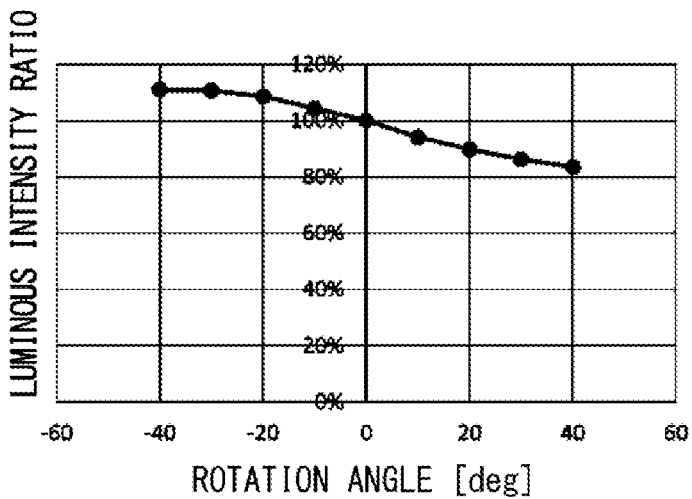
Figure 5B:
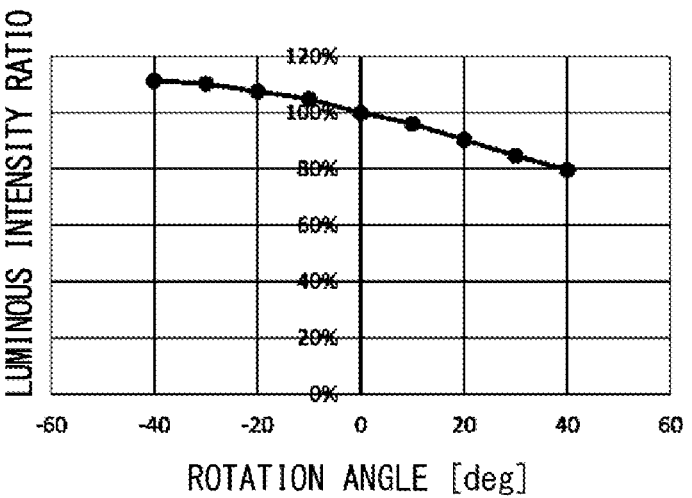
Figure 5C:
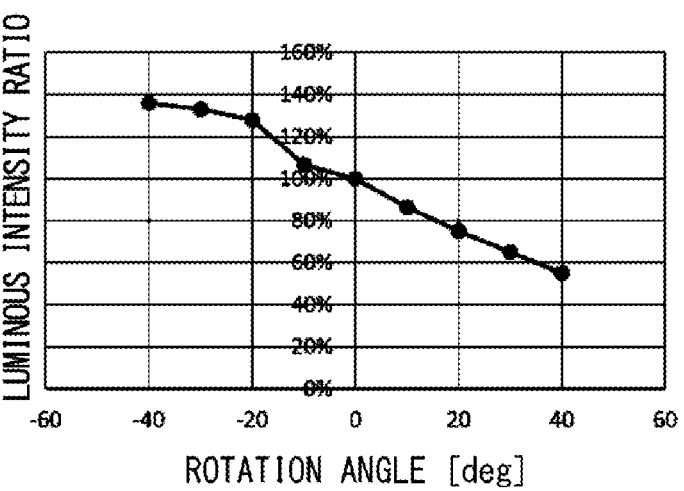

FIGS. 5A to 5C are diagrams showing measurement examples of the relative luminous intensity of the center of the projected image 10 meters away from the light emitted from the projection lens.

Figure 6A:
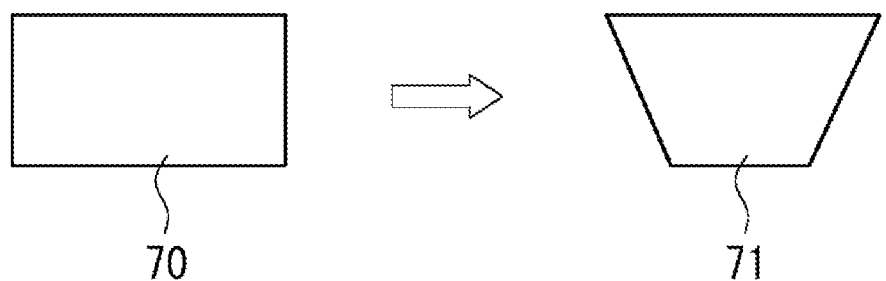
Figure 6B:
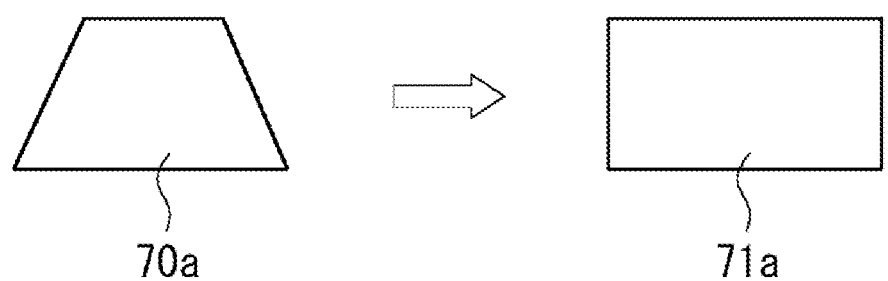

Each of FIGS. 6A and 6B is a diagram showing an example of the shape of projection light corresponding to the shape of a pixel portion in a plane view.

Figure 7A:
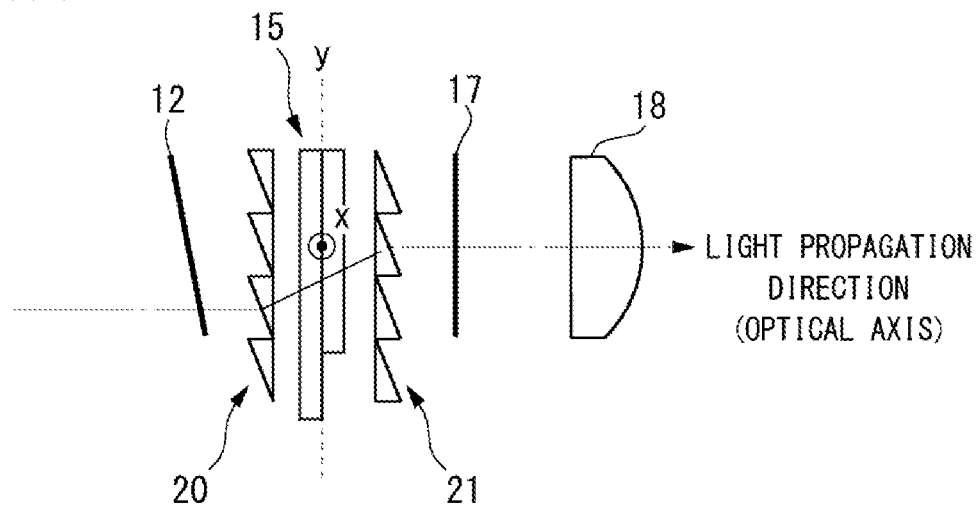

FIG. 7A is a diagram illustrating a configuration example in which a prism array is used instead of tilting the liquid crystal element.

Figure 7B:
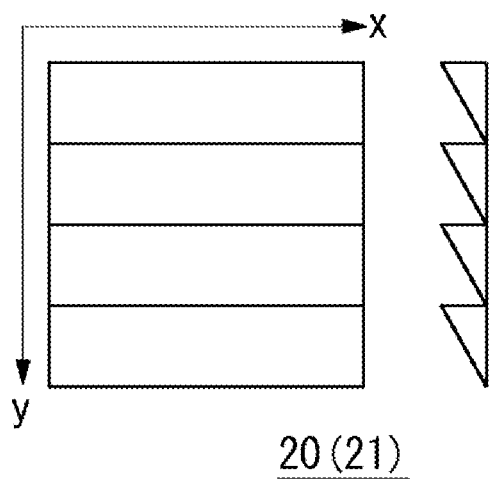
Figure 7C:
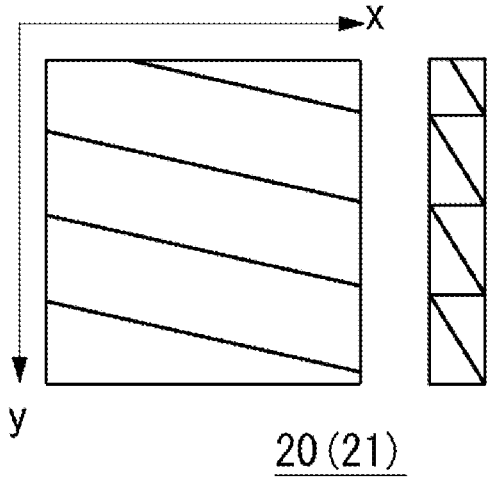

Each of FIGS. 7B and 7C is a diagram showing a configuration example of a prism array.

Figure 8A:
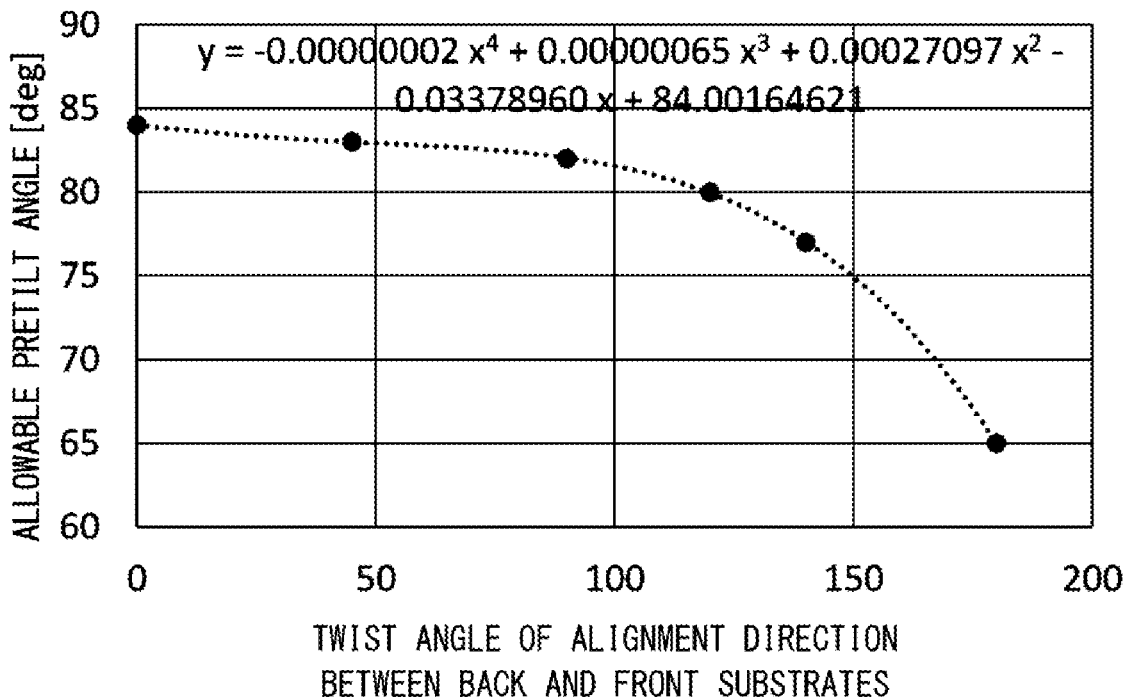

FIG. 8A is a graph of calculation result showing an example of the relationship between the alignment direction twist angle and the allowable pretilt angle.

Figure 8B:
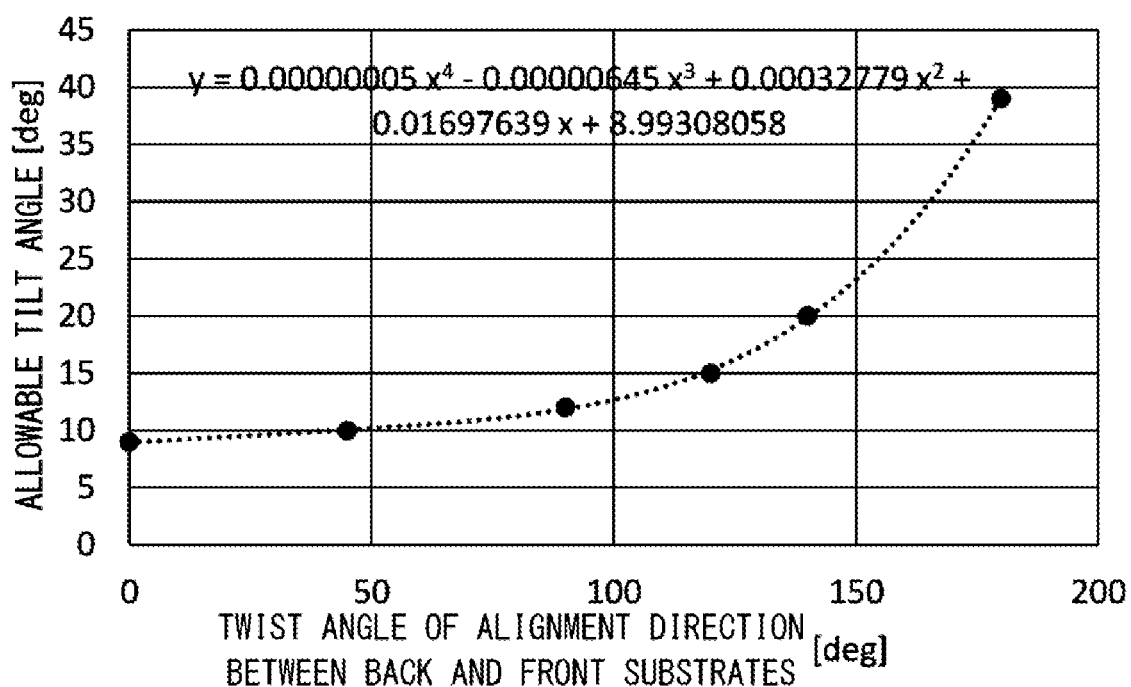

FIG. 8B is a graph of calculation result showing an example of the relationship between the alignment direction twist angle and the allowable tilt angle (swing angle).

Figure 9A:
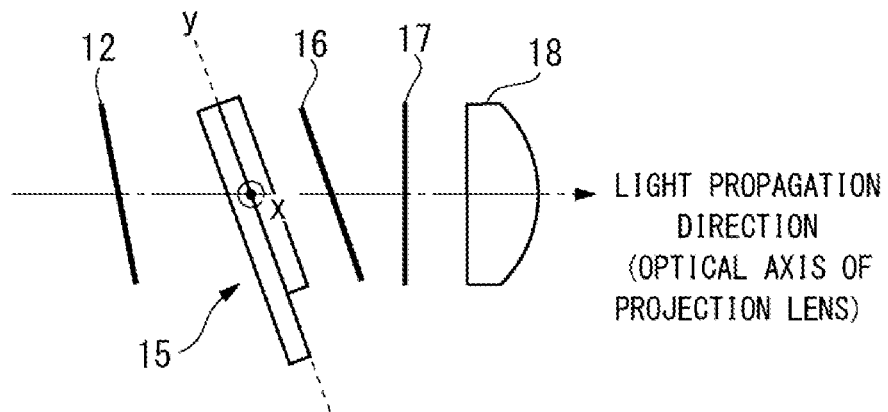
Figure 9B:
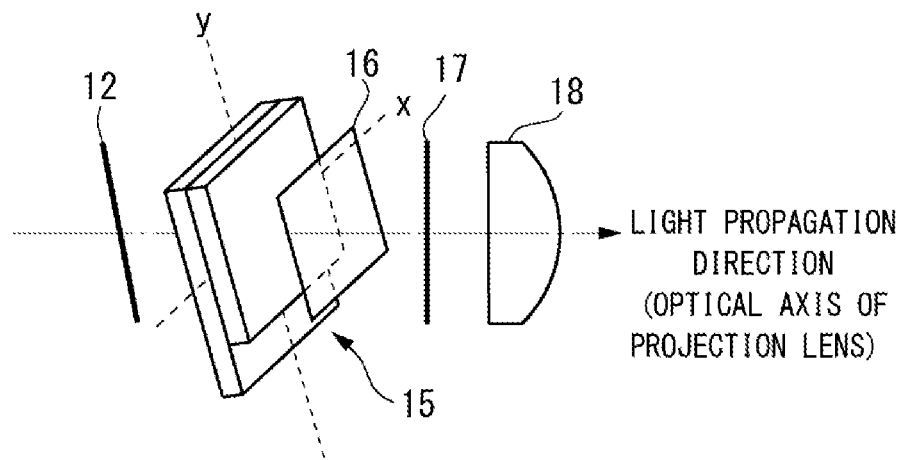

FIGS. 9A and 9B are diagrams showing an example of a configuration in which a liquid crystal element and an optical compensator are arranged at a tilt.

Figure 9C:
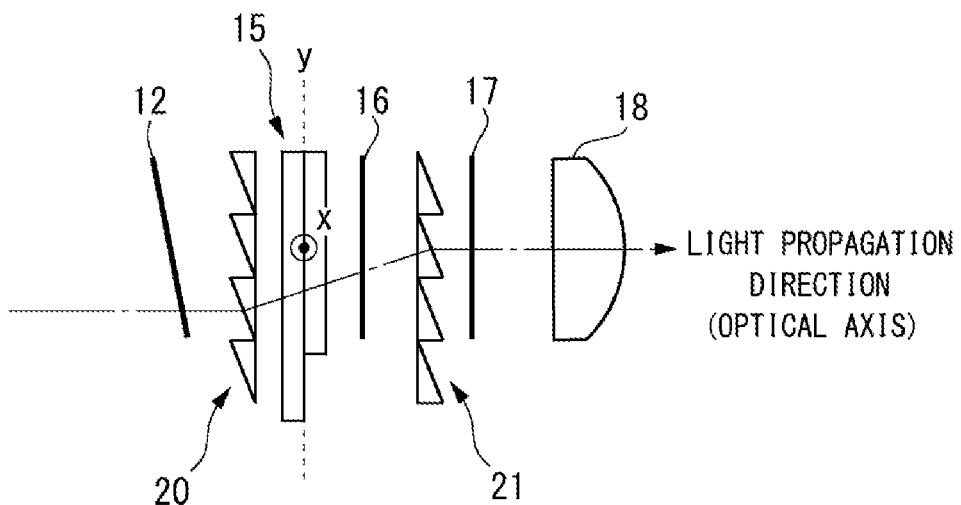

FIG. 9C is a diagram showing a configuration example in which a prism array is used instead of tilting the liquid crystal element, and in which an optical compensator is being arranged.

MODE FOR CARRYING OUT THE INVENTION

Figure 1:
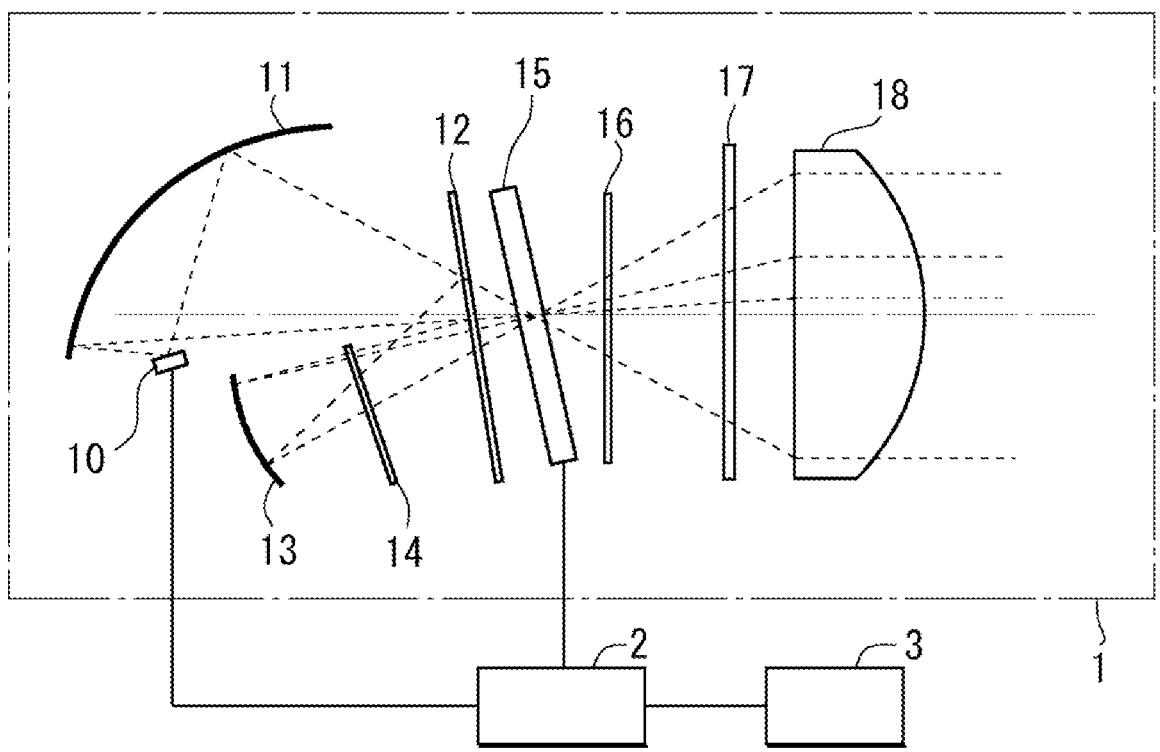
FIG. 1 is a diagram showing the configuration of a vehicle lamp system according to one embodiment.

FIG. 1 is a diagram showing the configuration of a vehicle lamp system according to one embodiment. The vehicle lamp system shown in FIG. 1 is configured to include a vehicle lamp (lamp unit) 1, a controller 2, and a camera 3. The vehicle lamp system detects the positions of vehicles or the faces of pedestrians in front of the own vehicle based on images taken by the camera 3, sets a certain range including the position of the vehicle ahead as a non-irradiation range (light reducing region), sets the other range as the light irradiation range and performs selective light irradiation, and irradiates light of various shapes onto the road surface.

The vehicle lamp 1 is disposed at a predetermined position at the front of the vehicle, and forms irradiated light for illuminating the front of the vehicle. Here, note that although one vehicle lamp 1 is provided on each of the left and right sides of the vehicle, only one is shown here.

The controller 2 controls the operation of a light source 10 and a liquid crystal element 15 of the vehicle lamp 1. The controller 2 is realized by using a computer system having, for example, a CPU (Central Processing Unit), a ROM (Read Only Memory), a RAM (Random Access Memory), etc., and by executing a predetermined operating program in the computer system. The controller 2 of the present embodiment turns on the light source 10 according to the operation state of a light switch (not shown) installed near the driver's seat, sets a light distribution pattern according to objects detected by the camera 3, such as a forward vehicle (oncoming vehicle, preceding vehicle), a pedestrian, a road sign, white lines on the road, or the like, provides a control signal to the liquid crystal element 15 for forming an image corresponding to the light distribution pattern.

The camera 3 photographs the space in front of the own vehicle to generate an image, and performs predetermined image recognition processing on this image to detect the position, range, size, type, etc. of the object such as the above-described forward vehicle. The detection results obtained by the image recognition processing are provided to the controller 2 which is connected to the camera 3. The camera 3 is installed at a predetermined position of the vehicle interior (for example, above the windshield) or at a predetermined position outside the vehicle interior (for example, inside the front bumper). If the vehicle is equipped with a camera for other purposes (for example, an automatic braking system, etc.), the camera may be shared.

Here, note that the function of the image recognition processing by the camera 3 may be replaced by the controller 2. In this case, the camera 3 outputs the generated image to the controller 2, and image recognition processing is performed by the controller 2 based on the image. Alternatively, both the image and the result of image recognition processing based on the image may be supplied from the camera 3 to the controller 2. In this case, the controller 2 may further perform its own image recognition processing using the image obtained from the camera 3.

The vehicle lamp 1 shown in FIG. 1 is configured to include the light source 10, reflectors (reflecting members) 11 and 13, a polarizing beam splitter 12, a quarter-wave plate 14, the liquid crystal element 15, an optical compensator 16, a polarizer 17, and a projection lens 18. Each of these elements is housed and integrated in one housing, for example. Further, the light source 10 and the liquid crystal element 15 are each connected to the controller 2. In the present embodiment, the polarizing beam splitter 12 corresponds to a "first polarizing element" and the polarizer 17 corresponds to a "second polarizing element".

The light source 10 emits light under the control of the controller 2. The light source 10 is configured to include, for example, several light emitting elements such as white LEDs (Light Emitting Diodes) and a drive circuit. Here, note that the configuration of the light source 10 is not limited thereto. For example, the light source 10 can be a laser element, or a light source commonly used in a vehicle lamp such as a light bulb or a discharge lamp.

The reflector 11 is arranged in correspondence with the light source 10, reflects and condenses the light emitted from the light source 10 so that it forms a focal point at a predetermined position, guides it toward the polarizing beam splitter 12, and allows the light to enter the liquid crystal element 15. The reflector 11 is, for example, a reflecting mirror having an ellipsoidal reflecting surface. In this case, the light source 10 can be placed near the focal point of the reflective surface of the reflector 11. Here, note that instead of the reflector 11, a condensing lens may be used as a condensing unit.

The polarizing beam splitter 12 is a transmissive reflective polarizing element that transmits polarized light in a specific direction of the incident light and reflects the polarized light in a direction perpendicular thereto, and is arranged on the light incident surface side of the liquid crystal element 15. As such a polarizing beam splitter 12, for example, a wire grid type polarizing element, a multilayer film polarizing element, or the like can be used.

The reflector 13 is provided at a position where the light reflected by the polarizing beam splitter 12 can be incident, and reflects the incident light in the direction of the polarizing beam splitter 12.

The quarter-wave plate 14 is disposed on the optical path between the polarizing beam splitter 12 and the reflector 13, and provides a phase difference to the incident light. In the present embodiment, the light reflected by the polarizing beam splitter 12 passes through the quarter-wave plate 14, is reflected by the reflector 13 and passes through the quarter-wave plate 14 again, thereby rotating the polarization direction by 90°, then enters the polarizing beam splitter 12 again. Thereby, the re-entering light becomes more easily transmitted through the polarizing beam splitter 12, so that the light utilization efficiency is improved.

The liquid crystal element 15 is arranged corresponding to the focal point of the light reflected and condensed by each of the reflectors 11 and 13, and is arranged so that the light enters therein. The liquid crystal element 15 includes a plurality of pixel portions (light modulation portions) that can be controlled independently of each other. In the present embodiment, the liquid crystal element 15 has a driver (not shown) for applying a driving voltage to each pixel portion. Based on a control signal supplied from the controller 2, the driver applies a driving voltage to the liquid crystal element 15 to individually drive each pixel portion. As shown in the figure, the light incident on the liquid crystal element 15 is incident on the light incident surface of the liquid crystal element 15 at a wide angle. Specifically, light is incident at a wide angle of about 40° to 60° with respect to the normal direction of the light incident surface.

The optical compensator 16 is for compensating the phase difference of the light transmitted through the liquid crystal element 15 and increasing the degree of polarization, and is arranged on the light emitting surface side of the liquid crystal element 15. Specifically, the phase difference of the optical compensator 16 is set so that the sum of the phase difference of the liquid crystal layer 15 and the optical compensator becomes 0 or a value close to it. Here, note that the optical compensator 16 may be omitted.

The polarizer 17 is arranged on the light emitting surface side of the liquid crystal element 15. An image corresponding to a light distribution pattern of light irradiated to the front of the own vehicle is formed by the polarizing beam splitter 12, the polarizer 17, and the liquid crystal element 15 disposed therebetween.

The projection lens 18 is arranged at a position where the light reflected and condensed by the reflectors 11 and 13 and transmitted through the liquid crystal element 15 can be incident thereon, and projects this incident light to the front of the own vehicle. The projection lens 18 is arranged so that its focal point corresponds to the position of the liquid crystal layer of the liquid crystal element 15. The optical axis of the projection lens 18 is along the left-right direction in the figure, as shown by a dashed line in the figure.

Figure 2A:
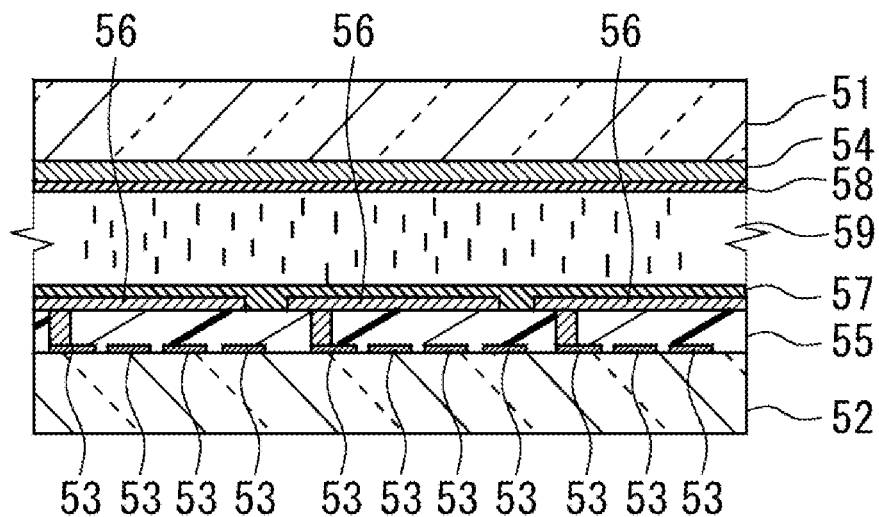
FIG. 2A is a schematic cross-sectional view showing a configuration example of a liquid crystal element.

FIG. 2A is a schematic cross-sectional view showing a configuration example of a liquid crystal element. Here, a segment display type liquid crystal element is illustrated. Specifically, the illustrated liquid crystal element 15 is configured to include a first substrate 51 and a second substrate 52 that are arranged to face each other, a plurality of wirings 53, a common electrode (counter electrode) 54, an insulating layer (insulating film) 55, a plurality of pixel electrodes 56, alignment films 57 and 58, and a liquid crystal layer 59.

The first substrate 51 and the second substrate 52 are each rectangular substrates in a plane view, for example, and are arranged to face each other. As each substrate, for example, a transparent substrate such as a glass substrate or a plastic substrate can be used. Between the first substrate 51 and the second substrate 52, spherical spacers (not shown) made of, for example, a resin film are distributed, and these spherical spacers maintain a gap between the substrates at a desired distance (for example, on the order of several μm). Here, note that instead of the spherical spacer, a columnar body made of resin or the like may be provided on the first substrate 51 side or the second substrate 52 side and used as a spacer. In the present embodiment, it is assumed that the respective substrates are arranged such that the first substrate 51 faces the polarizer 17 and the second substrate 52 faces the polarizing beam splitter 12. That is, each substrate is arranged so that the first substrate 51 side becomes the light emitting side of the liquid crystal element 15, and the second substrate 52 becomes the light incident side of the liquid crystal element 15.

The plurality of wirings 53 are provided on the lower layer side of the insulating layer 55 on one side of the second substrate 52. These wiring portions 53 are formed by appropriately patterning a transparent conductive film such as indium tin oxide (ITO). Each wiring 53 is for applying a voltage to each pixel electrode 56 from the driver.

The common electrode 54 is provided on one side of the first substrate 51. This common electrode 54 is integrally provided so as to face each pixel electrode 56 of the second substrate 52. The common electrode 54 is formed by appropriately patterning a transparent conductive film such as indium tin oxide (ITO).

The insulating layer 55 is provided above each wiring 53 on one side of the second substrate 52 so as to cover them. In the present embodiment, the insulating layer 55 is provided so as to cover substantially the entire one side of the second substrate 52. This insulating layer 55 is, for example, a $SiO_2$ film or a SiON film, and can be formed by a gas phase process such as sputtering or a solution process. Here, note that an organic insulating film may be used as the insulating layer 55. The thickness of the insulating layer 55 is, for example, about 1 μm.

The plurality of pixel electrodes 56 are provided above the insulating layer 55 on one side of the second substrate 52. These pixel electrodes 56 are configured by appropriately patterning a transparent conductive film such as indium tin oxide (ITO). In the present embodiment, a pixel portion is configured in a portion where each pixel electrode 56 and the common electrode 54 face each other.

Each pixel electrode 56 is physically and electrically connected to one of the wirings 53 via a through hole provided in the insulating layer 55. In this way, by providing each pixel electrode 56 and each wiring 53 on different layers, there is no need to provide wiring between the pixel electrodes 56, so the gap between the pixel electrodes 56 can be reduced and the aperture ratio can be increased, and the amount of transmitted light can be increased. Further, the degree of layout freedom for each wiring 53 is also increased.

The alignment film 57 is disposed above each pixel electrode 56 on one side of the first substrate 51 so as to cover them. The alignment film 58 is disposed above the common electrode 54 on one side of the second substrate 52 so as to cover it. These alignment films 57 and 58 are for regulating the alignment state of the liquid crystal layer 59. Each of the alignment films 57 and 58 has been subjected to a uniaxial alignment process such as a rubbing process, and has a uniaxial alignment regulating force that regulates the alignment of liquid crystal molecules in the liquid crystal layer 59 along its direction. The directions of the alignment treatment on each of the alignment films 57 and 58 are set, for example, to be alternate (anti-parallel). The pretilt angle near the interface between each of the alignment films 57 and 58 and the liquid crystal layer 59 is, for example, about 89°.

The liquid crystal layer 59 is provided between the first substrate 51 and the second substrate 52. The liquid crystal layer 59 is made of, for example, a fluid nematic liquid crystal material. In the present embodiment, the liquid crystal layer 59 is configured using a liquid crystal material that has negative dielectric anisotropy and is added with a left-twisting chiral material. The amount of chiral material added can be set, for example, so that d/p=0.31. Here, "d" is the layer thickness of the liquid crystal layer 59, and "p" is the chiral pitch. The thickness of the liquid crystal layer 59 can be, for example, about 4 μm.

Here, note that there are no particular limitations on the internal structure or driving method of the liquid crystal element 15 as long as it can freely modulate transmitted light to form a desired image. For example, in the above configuration example, the wiring and the pixel electrode are formed in different layers, but the wiring is not limited thereto, and they may be formed in the same layer. Further, as the liquid crystal element 15, an active matrix type liquid crystal element configured by associating a thin film transistor with each pixel may be used, or a simple matrix type liquid crystal element in which multiple striped transparent electrodes are arranged facing each other and each area where the transparent electrodes overlap serves as a pixel portion may be used. Further, as the liquid crystal element 15, a segment display type liquid crystal element having a plurality of arbitrarily shaped pixel electrodes provided on one substrate and one (or more) counter electrodes provided on the other substrate may be used. As for the driving method in this case, multiplex driving or static driving may be used.

Figure 2B:
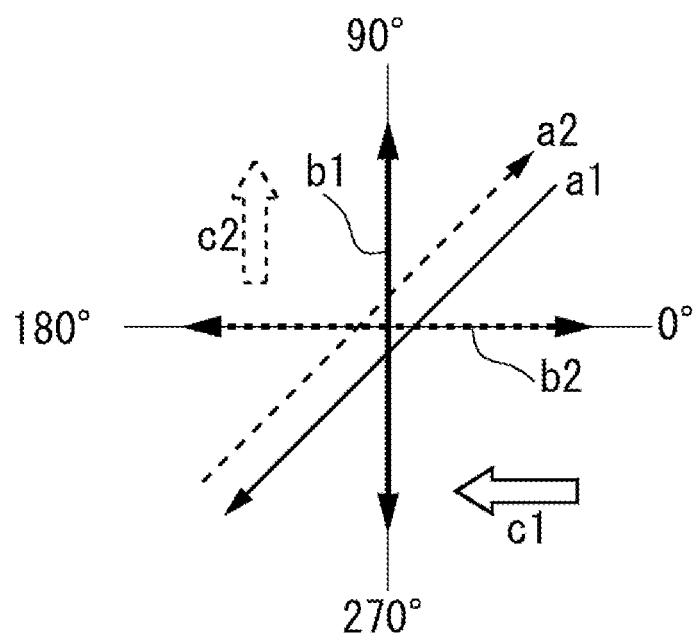
FIG. 2B is a diagram for explaining the direction of uniaxial alignment treatment on each alignment film.

FIG. 2B is a diagram for explaining the direction of uniaxial alignment process on each alignment film. Here, the direction of the uniaxial alignment process on each alignment film is shown when the liquid crystal element 15 is viewed in a plane view from the first substrate 11 side. As shown in the figure, for example, the transmission axis b1 of the polarizer 17 on the front side (light emitting side) is arranged in the 90°-270° azimuth orientation, and the transmission axis b2 of the polarizing beam splitter 12 on the back side (light incidence side) is arranged in the 0°-180° azimuth orientation. And the direction a1 of the uniaxial alignment process on the alignment film 57 of the first substrate 51 corresponding to the front side is set to 225° azimuth orientation, and the direction a2 of the uniaxial alignment process on the alignment film 58 of the second substrate 52 corresponding to the back side is set to 45° azimuth orientation. That is, the directions a1 and a2 of each uniaxial alignment process are arranged so as to form an angle of 45° with respect to each transmission axis b1 and b2. Here, note that in practice, the relative angles may differ due to positional deviations during manufacturing, etc., therefore as the relative angles of the directions a1 and a2 of the uniaxial alignment process with respect to the respective transmission axes b1 and b2, for example, a range of about 45°±5° is allowed.

The alignment film 57 of the first substrate 51 has a uniaxial alignment regulating force along the direction a1 in an initial state where no voltage is applied to the liquid crystal layer 59, and the alignment film 58 of the second substrate 52 has a uniaxial alignment regulating force along the direction a2 in an initial state where no voltage is applied to the liquid crystal layer 59. As a result, the liquid crystal layer 59 becomes uniformly aligned (monodomain alignment) under the uniaxial alignment regulating force from each of the alignment films 57 and 58 in the initial alignment state. Further, when a voltage is applied to the liquid crystal layer 59, the alignment direction of the liquid crystal molecules changes to become horizontal to the substrate surfaces of the respective substrates 51 and 52, as if they are falling, and twisted alignment occurs due to the influence of the chiral material. For example, when a voltage that is 2.5 times or more than the threshold voltage of the liquid crystal material is applied to the liquid crystal layer 59, near the interface between the first substrate 51 and the liquid crystal layer 59 which corresponds to the front side, the substantial alignment direction of the liquid crystal molecules becomes 180° azimuth orientation (direction c1 in the figure), and near the interface between the second substrate 52 and the liquid crystal layer 59 which corresponds to the back side, the substantial alignment direction of the liquid crystal molecules becomes 90° azimuth orientation (direction c2 in the figure).

Figure 3A:
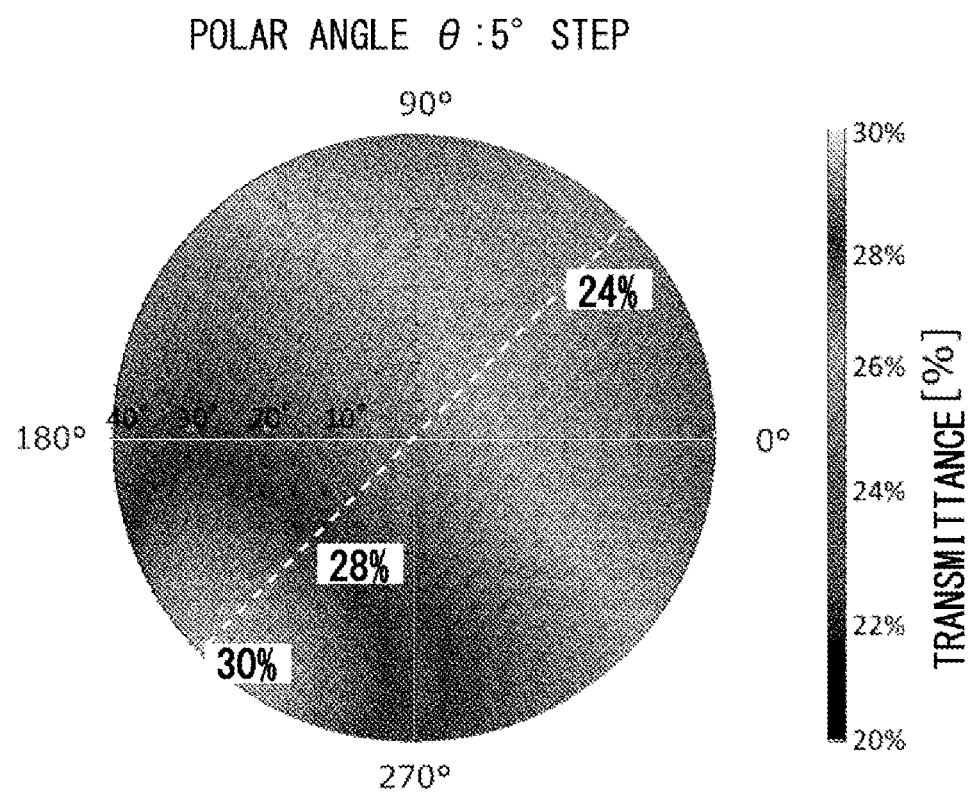
FIG. 3A is a diagram showing a measurement example of transmittance characteristics of a liquid crystal element.
Figure 3B:
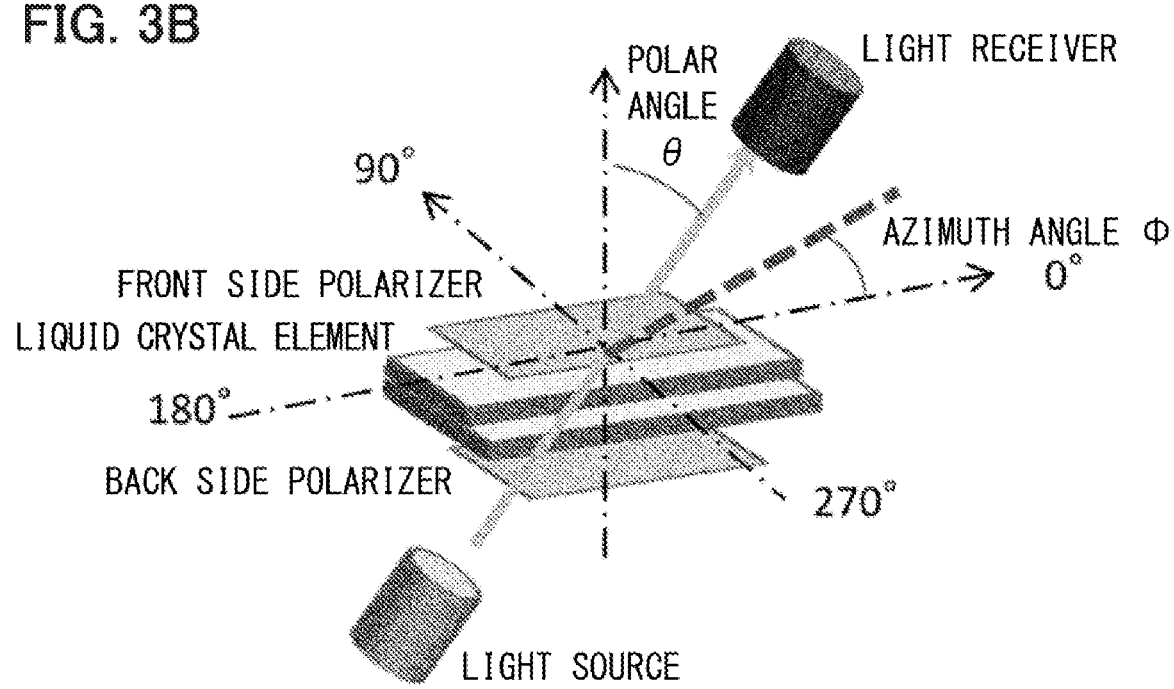
FIG. 3B is a diagram for explaining the arrangement of a measurement system when performing transmittance measurement.

FIG. 3A is a diagram showing a measurement example of transmittance characteristics of a liquid crystal element. Further, FIG. 3B is a diagram for explaining the arrangement of a measurement system when performing transmittance measurement. As shown in FIG. 3B, the polar angle θ is defined based on an axis substantially perpendicular to each substrate surface of the liquid crystal element, and the azimuth angle Φ is defined based on an axis substantially horizontal to each substrate surface of the liquid crystal element. The relative arrangement relationship between the liquid crystal element and each polarizer (front side polarizer, back side polarizer) is the same as that shown in FIG. 2B. This measurement system is configured such that light from a light source passes through a liquid crystal element and is received by a light receiver, and the polar angle θ and the azimuth angle Φ at this time can be set variably.

In FIG. 3A, an axis is set concentrically for the polar angle θ, the center of the circle corresponds to the polar angle θ=0, and the outermost circumference corresponds to the polar angle θ=40°. Further, with regard to the azimuth angle Φ, the left-right direction in the figure corresponds to 0°-180°, and the up-down direction in the figure corresponds to 90°-270°. Further, this measurement example is a case where a sufficiently high voltage (for example, 12 V) that is 2.5 times or more than the threshold voltage is applied to the liquid crystal layer 59 of the liquid crystal element. As shown in the figure, the best viewing azimuth orientation is the azimuth orientation of Φ=225° (7:30 degree azimuth orientation), and as shown in the figure which shows a specific numerical example of the transmittance in this azimuth orientation, the transmittance tends to increase as the polar angle θ increases. Further, the transmittance is relatively high in the two azimuth orientation perpendicular to the best viewing azimuth orientation, but the transmittance is relatively low in the anti-viewing direction (the azimuth orientation of Φ=45°) that is 180° different from the best viewing azimuth orientation. This is because monodomain alignment in which liquid crystal molecules are aligned obliquely in one azimuth orientation occurs in the liquid crystal layer 59. Here, note that this tendency is the same even when the above-described polarizing beam splitter 12 is used as a polarizing element, and it is also the same when a transmissive reflective polarizer made of an optical multilayer film is used. From the above description, a knowledge such that, by tilting and arranging the liquid crystal element 15 (specifically, the liquid crystal layer 59) in correspondence with the best viewing azimuth orientation, maximum luminous intensity of the irradiated light from the vehicle lamp 1 can be increased by utilizing the transmittance when the above-described polar angle θ is increased, is acquired. In the following, the arrangement of the liquid crystal element 15 to which this knowledge is applied will be specifically described.

FIG. 4A is a diagram showing a configuration in which the liquid crystal element is arranged without being tilted (standard configuration). Here, in order to make the description easier to understand, the main components such as the liquid crystal element 15, the polarizing beam splitter 12 and the polarizer 17 disposed in front and rear of the liquid crystal element 15, and the projection lens 18 are shown. Further, the illustrated light propagation direction is the main propagation direction of light incident on the liquid crystal element 15 in FIG. 1, and specifically, it is an axis that is horizontal to the left-right direction in FIG. 1 and that passes through the liquid crystal element 15. Further, the light propagation direction is parallel to the optical axis of the projection lens 18. The optical axis of the projection lens 18 here is a virtual straight line passing through the center and focal point of the projection lens 18.

Based on the arrangement shown in FIG. 4A, the axis parallel to each substrate of the liquid crystal element 15 and parallel to the left-right direction of the liquid crystal element 15 (direction perpendicular to the plane of the diagram sheet surface) is defined as the x-axis, and the axis parallel to each substrate of the liquid crystal element 15 and along the vertical direction of the liquid crystal element 15 (up-down direction of the diagram sheet surface) is defined as the y-axis. Both the x-axis and the y-axis are axes that intersect the light propagation direction. In the present embodiment, the x-axis corresponds to the 0°-180° direction shown in FIG. 2B described above, and the y-axis corresponds to the 90°-270° direction shown in FIG. 2B described above. Further, in the arrangement shown in FIG. 4A, the x-axis corresponds to the left-right direction of the vehicle lamp 1, and the y-axis corresponds to the vertical direction of the vehicle lamp 1. In the state shown in FIG. 4A, the rotation angle of the x-axis and the rotation angle of the y-axis of the liquid crystal element 15 are both 0°. Further, the alignment direction of liquid crystal molecules approximately at the center in the layer thickness direction of the liquid crystal layer 59 of the liquid crystal element 15 is set to 45° azimuth orientation of FIG. 3B. This is the direction that forms an angle of 45° with respect to each of the x-axis and y-axis in the figure.

FIG. 4B is a diagram showing a configuration example in which the liquid crystal element is arranged at a tilt. In the illustrated example, the liquid crystal element 15 is arranged to be rotated by a predetermined angle around the x-axis. In the figure, a clockwise rotation angle (direction) is defined as positive, and a counterclockwise rotation angle (direction) is defined as negative. In the illustrated example, the rotation angle in the x-axis direction is set to a negative value. By tilting and arranging the liquid crystal element 15 so as to be non-orthogonal and non-parallel to the optical axis of the projection lens 18 in this way, the light propagation direction becomes oblique to the liquid crystal layer 59 of the liquid crystal element 15. In other words, the liquid crystal element 15 is arranged so that the optical axis of the projection lens 18 and the layer thickness direction of the liquid crystal layer 59 form an angle that is greater than 0° and less than 90°. Here, note that although not shown, the liquid crystal element 15 can be similarly arranged at a position rotated by a predetermined angle around the y-axis. Further, as shown in FIG. 4C, the liquid crystal element 15 can be arranged at a position rotated by a predetermined angle around both the x-axis and the y-axis.

FIGS. 5A to 5C are diagrams showing measurement examples of the relative luminous intensity of the center of the projected image 10 meters away from the light emitted from the projection lens. Specifically, they are graphs obtained by determining the rotation angle dependence of the luminous intensity ratio, assuming that the luminous intensity of the transmitted light in the reference arrangement shown in FIG. 4A is 100%. FIG. 5A shows the rotation angle dependence of the luminous intensity ratio when the liquid crystal element 15 is rotated and arranged around the x-axis. This arrangement corresponds to the case of rotation around the 0°-180° azimuth orientation shown in FIG. 3B described above. It can be seen that the luminous intensity ratio increases at a rotation angle which corresponds to the case of rotation in the 270° azimuth orientation, which is a rotation angle of a negative value, and the luminous intensity ratio decreases at a rotation angle of a positive value. Here, note that the reason for the rotation angle being set up to ±40° is because the incident angle of light that enters the liquid crystal element 15 at a wide angle generally falls within this range.

FIG. 5B shows the rotation angle dependence of the luminous intensity ratio when the liquid crystal element 15 is rotated and arranged around the y-axis. This arrangement corresponds to the case of rotation around the 90°-270° azimuth orientation shown in FIG. 3B described above. It can be seen that the luminous intensity ratio increases at a rotation angle which corresponds to the case of rotation in the 180° azimuth orientation, which is a a rotation angle of a negative value, and the luminous intensity ratio decreases at a rotation angle of a positive value.

FIG. 5C shows the rotation angle dependence of the luminous intensity ratio when the liquid crystal element 15 is rotated and arranged around the x-axis and the y-axis. This arrangement corresponds to the case of rotation around the 135°-315° azimuth orientation of FIG. 3B described above. It can be seen that the luminous intensity ratio increases at a rotation angle corresponding to the case of rotation in the 225° azimuth orientation, which is a rotation angle of a negative value, and the luminous intensity ratio decreases at a rotation angle of a positive value. Further, the increase in the luminous intensity ratio is greater than in the case where the element is rotated and arranged around only the x-axis, or only the y-axis.

As described above, by arranging the liquid crystal element 15 at a tilt so that the light propagation direction obliquely crosses the liquid crystal layer 59, it is possible to increase the luminous intensity ratio. That is, the luminous intensity (brightness) of the irradiation light emitted from the vehicle lamp 1 can be improved.

Here, since the present embodiment is assumed to be used as a vehicle lamp, in most cases, the light distribution angle in the vertical direction is set to be small, and the light distribution angle in the left-right direction is set to be large. In this case, it is considered that the segment to be controlled in the pixel portion of the liquid crystal element 15 is divided and set to be long in the x-axis direction and short in the y-axis direction. Since the optical system focuses on the intersection of the x-axis and y-axis of the liquid crystal element 15, if the position of the pixel portion of the liquid crystal element 15 deviates from its original position, a phenomenon may occur in which the pattern of the irradiated light may become out of focus. Thus, in the case of an irradiation light distribution pattern that spreads in the left-right direction, it is considered preferable to rotate around the x-axis direction. On the contrary, if the irradiation light distribution pattern spreads in the vertical direction, it is considered preferable to rotate around the y-axis direction. In order to obtain the same effect as the tilt angle of 225° azimuth orientation, it is considered preferable to set to $1/\sqrt{2}$ times the angle. As shown in FIG. 3A, since the maximum transmittance is approximately 38° at 225° azimuth orientation, in the case of rotating around the x-axis direction and the y-axis direction, the maximum transmittance is considered to be approximately 27°.

Here, note that when the liquid crystal element 15 is arranged at a tilt, the shape of the projection light formed by the pixel portion in a plane view is deformed with respect to the shape of the pixel portion in a plane view. For example, as shown in FIG. 6A, when the pixel section 70 has a rectangular shape in a plane view, if the liquid crystal element 15 is disposed at a position rotated around the x-axis, the shape of the irradiated image 71 formed by the projected light is deformed into a trapezoidal shape. In this regard, for example, as shown in FIG. 6B, by using a pixel portion 70a whose shape in a plane view is configured by considering the degree of deformation in advance, deformation of the irradiated light 71a can be suppressed. The same holds true when rotating around the y-axis or around both the x-axis and the y-axis, and the shape of the pixel portion in a plane view may be determined in advance by taking into account the degree of deformation. As a result, the plane view shape of the pixel portion and the plane view shape of the irradiated image become non-similar to each other.

Further, when the liquid crystal element 15 is arranged at a tilt, it is preferable that the polarizer 17 on the light emitting surface side is not tilted in correspondence with the liquid crystal element 15 and the incident light surface is arranged such that it is substantially perpendicular to the light propagation direction or the optical axis of the projection lens 18, as shown in FIGS. 5A to 5C. This is because if the polarizer 17 is arranged at a tilt, light leakage will increase when blocking transmitted light.

FIG. 7A is a diagram illustrating a configuration example in which a prism array is used instead of tilting the liquid crystal element. As shown in the figure, regarding the liquid crystal element 15, both the x-axis and the y-axis are set to 0° without any rotation angle, and prism arrays 20 and 21 may be arranged on the light incident surface side and the light emitting surface side of the liquid crystal element 15, respectively. For example, FIG. 7B shows a configuration example of the prism arrays 20 and 21 in order to obtain the same effect as when a rotation angle is set around the x-axis.

The illustrated prism array 20 (or 21) is configured by arranging in the y-axis direction a plurality of prisms having a triangular cross section, each prism extending along the x-axis. By using such prism arrays 20 and 21, the light propagation direction can also be configured to obliquely intersect with the layer thickness direction of the liquid crystal layer 59 of the liquid crystal element 15 at a non-orthogonal and non-parallel angle. Further, by arranging the prism array 20 and the prism array 21 so that their prism slopes are substantially parallel to each other, the light propagation direction of the incident light on the polarizer 17 can be made substantially perpendicular to the incident plane.

Here, although not shown, in order to obtain the same effect as when a rotation angle is set around the y-axis, a prism array configured by rotating the prism array 20 (or 21) shown in FIG. 7B by 90° may be used. Further, in order to obtain the same effect as when the liquid crystal element 15 is arranged by rotating around the x-axis and the y-axis, the prism arrays 20, 21 of the configuration example shown in FIG. 7C may be used. Specifically, the prism array 20 (or 21) is configured such that the extending direction of each prism is neither parallel to the x-axis nor perpendicular to the y-axis, but forms a predetermined angle to each axis. In other words, the extending direction of each prism is configured to be non-orthogonal and non-parallel to the outer shape side of the liquid crystal element 15.

By using the prism arrays 20 and 21 in this way, since a similar effect can be obtained without tilting the liquid crystal element 15 itself, the layout around the liquid crystal element 15 of the vehicle lamp 1 becomes easier, and the optical design also becomes easier. Further, it is also expected to have an effect of sharpening the outline of the image irradiated by the irradiated light.

Next, numerical examples of suitable angles for tilting the liquid crystal element 15 will be described. As shown in FIG. 2A, since the light distribution direction of the liquid crystal molecules at approximately the center in the layer thickness direction of the liquid crystal layer 59 of the liquid crystal element 15 is set to 45° azimuth orientation, it is preferable to provide a tilt angle corresponding to 225° azimuth orientation which is the opposite side of the 45° direction. Here, in the observation example shown in FIG. 3A, the polar angle at which the transmittance becomes the greatest is about 38° at 225° azimuth angle. However, when tilted at such an angle, in a case where no voltage is applied to the liquid crystal element 15, there is a possibility that light leakage occurs due to obliquely observing the liquid crystal element 15. When the transmission axis of each polarizing element (polarizing beam splitter 12, polarizer 17) and the arrangement relationship of the liquid crystal element 15 are configured as shown in FIG. 2B, as a result of external observation of an actual sample, the pretilt angle at which light leakage is allowed is 84° or more. When the liquid crystal element 15 with a pretilt angle of 89° is arranged at a tilt between two polarizing elements, it is considered that the allowable value of the tilt angle is when the angle of incident light to the liquid crystal layer becomes equivalent to the above-described allowable pretilt angle due to the tilt. Therefore, when the refractive index of the air layer outside the liquid crystal element 15 is set to 1, the refractive index of each substrate (glass substrate) constituting the liquid crystal element 15 is set to 1.52, the ordinary refractive index of the liquid crystal material is set to 1.48, and the extraordinary refractive index is set to 1.59, the allowable tilt angle becomes approximately 9°. Here, in the case of a configuration using a prism array, the refraction angle of the prism array may be designed in accordance with this tilt angle.

Here, in each of the above-described embodiments, cases are shown in which the directions a1 and a2 of the uniaxial alignment treatment on each of the first substrate 11 and the second substrate 12 are anti-parallel alignment (anti-parallel to each other). However, the allowable pretilt angle indicated above changes when, the alignment direction of liquid crystal molecules at approximately the center of the liquid crystal layer 59 in the layer thickness direction is fixed without being changed, the directions a1 and a2 of the uniaxial alignment treatment on each of the first substrate 11 and the second substrate 12 are set to be non-parallel to each other, and the alignment is twisted along the layer thickness direction of the liquid crystal layer 59. Hereinafter, note that the first substrate 11 and the second substrate 12 will be collectively referred to as "back and front substrates".

Using SHINTECH Co.'s one-dimensional analysis software for liquid crystal display elements, FIG. 8A shows calculation result of allowable change in pretilt angle when the twist angle of the alignment direction between the back and front substrates changes. As shown in the figure, it can be seen that the allowable pretilt angle decreases as the twist angle increases. The plots are the result of the calculation, and the broken line is a curve obtained by least squares curve fitting using a quartic function. This quartic function is expressed as follows. In the figure, the twist angle in the alignment direction between the back and front substrates is defined as x, and the allowable pretilt angle is defined as y.

$$y=0.00000002x^4+0.00000065x^3+0.00027097x^2-0.033789\,6x+84.00164621$$

Further, based on the calculation result of FIG. 8A, the angle of incident light entering the back and front substrates (glass substrates) from the air layer, that is, the tilt angle (swing angle) corresponding to the allowable angle of incidence, is calculated using Snell's law and its result is shown in FIG. 8B. The plots are the result of the calculation, and the broken line is a curve obtained by least squares curve fitting using a quartic function. In the figure, the twist angle in the alignment direction between the back and front substrates is defined as x, the allowable tilt angle (swing angle) is defined as y, and can be expressed as follows.

$$0.00000005x^4-0.00000645x^3+0.00032779x^2+0.01697639x+8.99308058 \geq y > 0$$

The above description is the angle when the tilt angle is set to 225° azimuth orientation, but when rotating only in the x-axis direction or y-axis direction as shown in FIG. 4A, the result will be $1/\sqrt{2}$ times, therefore the following is obtained.

$$0.00000004x^4-0.00000456x^3+0.00023178x^2+0.01200412x+6.35906826 \geq y > 0$$

On the other hand, in the optical system of FIG. 1, the liquid crystal element 15 and the optical compensator 16 are arranged between the polarizing elements. In FIG. 1, when the vertical direction of the diagram sheet surface is defined as the y-axis direction, the front-back direction of the diagram sheet surface is defined as the x-axis direction, and the light propagation direction, that is, the in-plane normal direction of the optical compensator 16 is defined as the z-axis direction, and further, when the refractive index of the optical compensator 16 in the x, y, and z axis directions is defined as nx, ny, and nz, it is assumed that the optical compensator 16 has negative uniaxial optical anisotropy such that nx≈ny>nz. Here, for example, as shown in the configuration example of FIG. 9A or FIG. 9B, the optical compensator 16 is tilted at the same angle as the tilt angle of the liquid crystal element 15, so that the allowable tilt angle is not subject to any above-described restrictions. Here, note that the tilt angle of the optical compensator 16 does not necessarily have to be the same as the tilt angle of the liquid crystal element 15. Further, the same applies when using a prism array, and for example, as shown in FIG. 9C, it is preferable to arrange the optical compensator 16 between the liquid crystal element 15 and the prism array 21 so as to be substantially parallel to the liquid crystal element 15. Further, the same effect can be obtained even when the optical compensator 16 has negative biaxial optical anisotropy where nx<ny<nz. This is because the phase difference created by the liquid crystal layer 59 of the liquid crystal element 15 can be canceled out by the phase difference of the optical compensator 16. However, on the assumption that a wire grid polarizer or a transmissive reflective polarizer made of an optical multilayer film is used as a polarizing element, it is preferable that the thickness direction retardation Rth of the optical compensator 16 that achieves this is within the range of $\Delta nd \times 0.8 \leq Rth \leq \Delta nd \times 1.2$. Here, "d" is the layer thickness of the liquid crystal layer 59 of the liquid crystal element 15, and "$\Delta n$" is the refractive index anisotropy of the liquid crystal layer 59. On the other hand, since the angle of incident light that enters the liquid crystal element 15 from the light source 10 via the reflector 11 is within the polar angle range of 40° in all azimuth orientation, the tilt angle of the liquid crystal element 15 is at most less than 50°.

According to each of the embodiments described above, it is possible to improve the brightness of irradiated light in a lighting apparatus or the like that uses a liquid crystal element.

Note that the present disclosure is not limited to the contents of the embodiments described above, and can be implemented with various modifications within the scope of the gist of the present disclosure. For example, in the above-described embodiments, a vehicle lamp is cited as an example of a lighting apparatus, but the scope of application of the present disclosure is not limited thereto. For example, the configurations according to the present disclosure can be applied to various lighting apparatus such as street lights, railroad crossing lighting apparatus, and direction guide lighting apparatus, etc. Furthermore, the optical system of the vehicle lamp is not limited to the configuration of the embodiments described above.

REFERENCE SIGNS LIST

1: Vehicle lamp
2: Controller
3: Camera
10: Light source
11, 13: Reflector
12: Polarizing beam splitter
14: ¼ wavelength plate
15: Liquid crystal element
16: Optical compensator
17: Polarizer
18: Projection lens
20, 21: Prism array
51: First substrate
52: Second substrate
53: Wiring
54: Common electrode (Counter electrode)
55: Insulating layer (Insulating film)
56: Pixel electrode
57, 58: Alignment film
59: Liquid crystal layer

The invention claimed is:
1. A lighting apparatus comprising:
a light source;
a condensing unit that condenses light emitted from the light source so that it forms a focal point at a predetermined position;
a liquid crystal element arranged corresponding to the position of the focal point;
a first polarizing element located at a light incident side of the liquid crystal element;
a second polarizing element located at a light emitting side of the liquid crystal element;
a projection lens that magnifies and projects images generated by the liquid crystal element, the first polarizing element, and the second polarizing element;
a first prism array disposed between the liquid crystal element and the first polarizing element; and
a second prism array disposed between the liquid crystal element and the second polarizing element;

wherein the liquid crystal element is arranged such that the light incident surface and/or the light emitting surface are substantially perpendicular to an optical axis of the projection lens, and wherein the first prism array refracts a traveling direction of the light heading toward the liquid crystal element and causes the light incident to the liquid crystal element, and the second prism array refracts a traveling direction of the light emitted from the liquid crystal element and causes the light incident to the second polarizing element.

2. The lighting apparatus according to claim 1, wherein the first polarizing element is a transmissive reflective polarizing element that reflects a polarized light of a first direction and transmits a polarized light of a second direction which is perpendicular to the first direction.

3. The lighting apparatus according to claim 1, wherein the second polarizing element is arranged such that a light incident surface of the second polarizing element is substantially perpendicular to the optical axis of the projection lens.

4. The lighting apparatus according to claim 1, wherein the liquid crystal element has at least one pixel portion, and wherein a plane view shape of an irradiation image projected by the projection lens is non-similar to a plane view shape of the pixel portion.

5. The lighting apparatus according to claim 1, wherein the liquid crystal element is a monodomain vertically aligned liquid crystal element.

6. The lighting apparatus according to claim 1, wherein each of the first prism array and the second prism array includes a plurality of prisms extending in one direction, and wherein each extending direction of the plurality of prisms is non-parallel and non-orthogonal to an outer shape side of the liquid crystal element.

7. A vehicle lamp system comprising the lighting apparatus according to claim 1 and a controller that is connected to the lighting apparatus and controls its operation.

* * * * *